United States Patent [19]

Wohlrab

[11] Patent Number: 4,824,255
[45] Date of Patent: Apr. 25, 1989

[54] DRIVE APPARATUS FOR A SCREW INJECTION MOLDING UNIT AND A PROCESS FOR ITS OPERATION

[75] Inventor: Walter Wohlrab, Weissenburg, Fed. Rep. of Germany

[73] Assignee: Krauss-Maffei A.G., Fed. Rep. of Germany

[21] Appl. No.: 66,460

[22] Filed: Jun. 26, 1987

[30] Foreign Application Priority Data

Jun. 26, 1986 [DE] Fed. Rep. of Germany ....... 3621463

[51] Int. Cl.$^4$ ................................................ B29B 1/06
[52] U.S. Cl. ........................................... 366/78; 92/2; 92/108; 366/100; 366/289; 425/583; 425/587
[58] Field of Search ...................... 366/78, 69, 79, 332, 366/100, 334, 289, 335, 145; 425/208, 582, 209, 583, 586, 587; 92/2, 33, 108, 113

[56] References Cited

U.S. PATENT DOCUMENTS

3,908,968 9/1975 Bielfeldt et al. ...................... 366/78
4,005,641 2/1977 Nussbaumer .............................. 92/2

Primary Examiner—Timothy F. Simone
Attorney, Agent, or Firm—Robert J. Koch

[57] ABSTRACT

A drive apparatus useful in screw injection molding apparatus is disclosed. The apparatus is particularly useful when both axial and rotational movements are required because the invention discloses a construction that reduces the wear attributed to sealing gaskets of relatively large diameter which are subjected to rotational stresses and relatively high linear velocities. In the injection molding embodiment described in detail, the extruder screw is rigidly attached to a drive piston that has both axial and rotational movements. Concentric to that drive piston is a drive cylinder tha has only axial movement yet is connected to the drive piston such that the piston is able to rotate freely relative to the cylinder but may move axially only when the cylinder moves. Thus, the sealing gaskets of the drive cylinder are free of rotational stresses which extends the useful life of the sealing gaskets. Furthermore, the piston and cylinder arrangement permits accurate control over the pressure exerted on the extruder screw.

18 Claims, 1 Drawing Sheet

DRIVE APPARATUS FOR A SCREW INJECTION MOLDING UNIT AND A PROCESS FOR ITS OPERATION

BACKGROUND OF THE INVENTION

1. Field of the Invention

The invention relates to a drive apparatus useful in screw injection molding units as well as other apparatus using simultaneous rotation around and displacement along an axis.

2. Description of Related Technology

A drive apparatus is disclosed in U.S. Pat. No. 4,005,641 (equivalent to DE No. 24 61 854) whose disclosure is incorporated herein by reference. The drive apparatus described has an extruder screw rigidly connected to a drive piston. This piston may rotate as well as displace along the rotation axis. Inside the piston is a drive shaft which engages the drive piston by a plurality of splines or ridges so that the shafts may rotate together but only the drive piston has axial movement. The drive shaft is connected to a motor shaft.

Screw injection molding processes are a particularly useful application for drive apparatus such as that of U.S. Pat. No. 4,005,641 because these processes have two stages where pressure from the drive apparatus is required. The first phase is in metering plastic material into the injection head. Typically, relatively low pressures are required and hydraulic pressure would be applied, in the U.S. Pat. No. 4,005,641 drive, to the smaller diameter of the drive shaft through a bore in the drive shaft.

The second phase is the injection stroke. The extruder screw is extended by applying pressure across the areas of both the drive shaft and piston to force plasticized material into a mold. By rotating both the shaft and piston, the screw may be rotated during the injection stroke.

In U.S. Pat. No. 4,005,641, the use of a bore in the drive shaft requires the use of shaft diameters sufficiently large to provide material strength and sufficient hydraulic area. As the drive piston diameter increases, the diameters of the sealing gaskets increases. Gaskets with larger diameters are subject to higher linear speeds and forces than those of smaller diameters. These stresses lead to failure and required maintenance.

SUMMARY OF THE INVENTION

One object of the invention disclosed herein is reducing the linear velocities experienced by the sealing means on the drive components.

Another object is the use of different hydraulic diameters for the accurate control of applied pressure as needed for the process application.

These objects are obtained by the use of an apparatus comprising:

means for rotating a drive shaft around a longitudinal axis; a drive piston with movement around and along said axis and coupled to said drive shaft; and a drive cylinder concentric with and connected by piston-and-cylinder coupling means to said drive piston. The piston-and-cylinder connection is such that said drive cylinder has substantially no rotational motion but the piston may rotate substantially freely relative to the cylinder. Furthermore, the piston displaces axially only when the drive cylinder displaces axially.

More particularly, the apparatus comprises;

a motor;

a drive shaft connected to receive torque from the motor;

a drive piston having axial and radial movement, connected at its motor end to the drive shaft with a plurality of splines or ridges such that torque from the motor rotates the drive piston;

a drive cylinder concentric with and attached to the drive piston such that the drive piston may rotate freely relative to the cylinder but the piston displaces axially only when the cylinder displaces;

an extruder screw rigidly connected to the drive piston at the piston end opposite the motor;

hydraulic lines in communication with at least the piston and cylinder; and hydraulic controls for independently applying pressure to the drive piston and drive cylinder for metering or injection and to the drive cylinder for retraction.

Hydraulic pressure forces the drive piston and cylinder to displace axially. The pressure is generated in conventional manner and communicates with the drive so as to independently use the different surface areas of the drive piston and the drive cylinder for accurate control of the applied pressure. Relatively modest axial forces do not require use of the whole cross section. Relatively large forces could use the combined areas for applying pressure across the entire cross section. For a low force return stroke, pressure would be applied to a relatively small area.

When used in an injection molding process, the drive shaft would be connected to an extruder ram, such as a screw, which would be moved forward to force plastic material through a nozzle. During the metering phase, plastic material is loaded in front of the extruder screw and behind the closed nozzle outlet. The screw is extended with or without rotation toward the nozzle so that heat and pressure plasticize the material. The screw is then retracted and the sequence starts again until enough material has accumulated for the mold volume. The extension is a relatively low pressure operation so pressure is applied only to the drive piston. Similarly, the retraction is also low pressure so pressure may be applied to a relatively small area such as a shoulder on the outer diameter of the drive cylinder.

During injection into the mold, the nozzle is opened and the extruder ram forces the plasticized material into the mold. This injection is a relatively high pressure phase so pressure is applied to both the drive piston and drive cylinder for effective use of their combined hydraulic diameters.

After injection, the ram is withdrawn for the start of another cycle. The retraction may be accomplished by applying pressure to the exemplary drive cylinder shoulder discussed above.

One method of coupling the drive shaft to the drive piston is by the use of splines and grooves. The drive shaft has splines which engage grooves in the concentric drive piston. The grooves permit the piston to move axially to the length of the drive shaft.

In the drive apparatus according to the invention, the drive piston is designed to have a smaller diameter than apparatus such as those of U.S. Pat. No. 4,005,641. This smaller diameter is sufficient to transfer torsional forces to an extruder screw yet provides advantages from having lower wear on the sealing gaskets of the larger diameter drive parts when an extruder screw must be rotated. The smaller diameter also affords the advantages of concentric drive parts which permits accurate pressure control due to a selection of hydraulic diameters. Each diameter (with its corresponding surface area) may be independently pressurized by separate hydraulic pressure lines.

Because the hydraulic fluid pressure may be accurately controlled with varying surface areas, the pressure of the hydraulic fluid need not be changed. The hydraulic controls may be set quite accurately and subsequent adjustments will be precise.

DETAILED DESCRIPTION OF A PREFERRED EMBODIMENT

Figure 1:
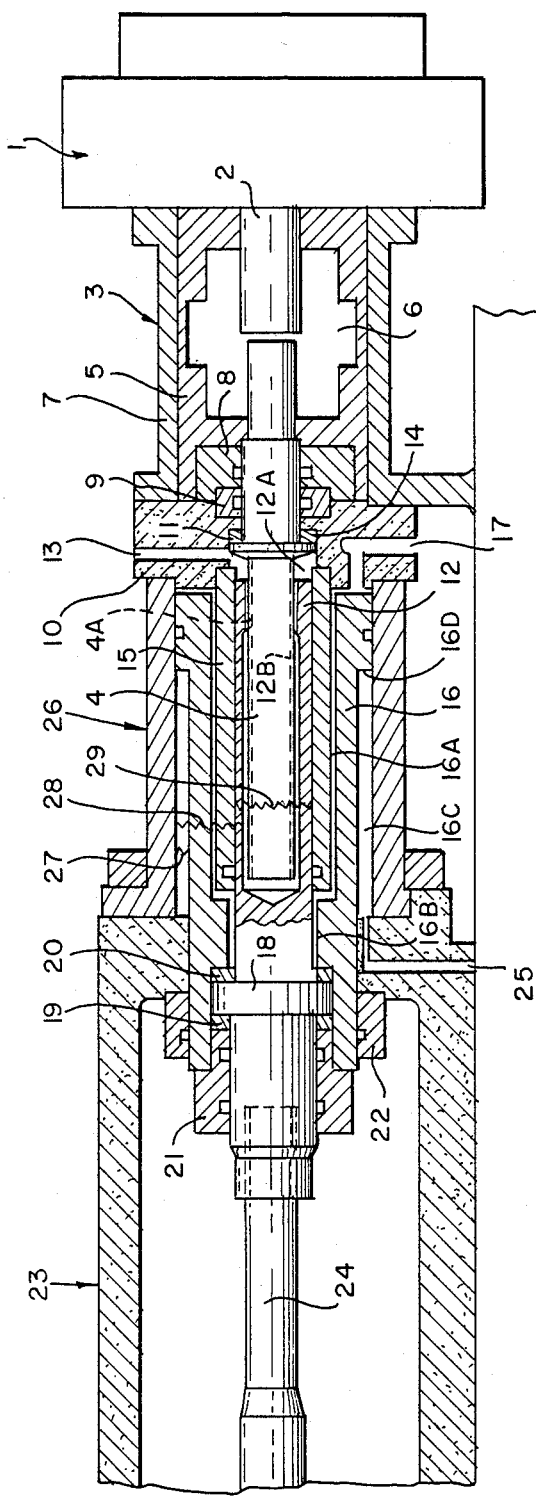
FIG. 1 shows an example of a drive apparatus according to the invention.

FIG. 1 shows a stationary screw injection molding unit according to an embodiment of the invention. During operation, extruder screw 24 is displaced along its longitudinal axis by applying hydraulic pressure to drive piston 12 and drive cylinder 16. If desired, screw 24 may be rotated during injection by the action of motor 1 on motor shaft 2, drive shaft 4, ridges 4A, drive piston grooves 12B, and drive piston 12. Drive piston 12 is rigidly connected to screw 24. The embodiment with rotation will be described so as to illustrate the relationships among the individual elements.

Motor 1 transmits torque to drive shaft 4 via motor shaft 2 and hydraulic coupling 3. Motor 1 may be hydraulic, electric, or some other suitable power source. Coupling 3 comprises pressure housing 5, oil chamber 6, and bearing block 7. Motor 1 is mounted to block 7. Drive shaft 4 and motor shaft 2 are on the same longitudinal axis but are separated by a slight distance. The viscosity of the hydraulic fluid within that space provides the friction necessary to transmit the torque of motor shaft 2 to drive shaft 4. The axial separation necessary depends, of course, on the particular hydraulic fluid used.

Drive shaft 4 passes through rotation bearings 8 and 9, bearing shield 10, collar 11, and terminates in boring 12A of drive piston 12. Bearing 8 is set into pressure housing 7, and bearing 9 is set at least half way into bearing shield 10. Bearing shield 10 is attached to pressure housing 7. Collar 11 is fitted around shaft 4 to transfer axial forces to bearing shield 10 via bearings 14 thus protecting the axial separation between shafts 2 and 4 as mentioned above.

In bore 12A, shaft 4 transmits rotational force to drive piston 12 through the communication of grooves 4A and ridges 12B. Ridges 12B and grooves 4A traverse the lengths of piston 12 and shaft 4, respectively. The degree of fit is such that there is little or no relative rotational movement between shaft 4 and piston 12, yet, piston 12 is able to traverse the length of shaft 4 upon the application of hydraulic pressure.

Rotation bearing 15 is at least partially around piston 12 and acts as a lubricated surface for rotation and axial displacement. Bearing 15 is attached to bearing shield 10. Bearing 15 lies with boring 16A of drive cylinder 16.

This drive cylinder 16 contains a plurality of borings of different diameters to house the various moving elements and to form the passageways for the hydraulic oil used for displacement. Bore 16B accommodates the diameter of piston 12, described above, while diameter 16C forms the passageway for hydraulic oil introduced in line 25 when returning rive cylinder 16 to its beginning position. Adequate clearances permit hydraulic oil from line 17 to surround bearing tube 15 and piston 12 thus acting as a lubricant and fluid communication means for hydraulically displacing piston 12, cylinder 16, and extruder screw 24. Screw 24 is rigidly connected to shaft 12.

Cylinder 16 and piston 12 are not connected but communicate axial forces by collar 18, axial bearings 19 and 20, and bearing cover 21. The connections are such that piston 12 may rotate freely relative to cylinder 16 yet displace axially when cylinder 16 is displaced. This relationship saves the sealing means in cylinder 16, e.g. gaskets, from the high linear speeds that would otherwise occur if cylinder 16 was rigidly connected to shaft 4. Those high linear speeds induce rotating stresses that shorten the useful lifetime of such gaskets. Removing the rotational forces at the radius of cylinder 16 thus reduces the maintenance required for replacement of those seals. The sealing means, e.g. gaskets, around piston 12 experience only the relatively low linear speeds at the smaller radius of piston 12 and thus have a much longer useful life.

Radial bearing 22 connects to the outside of cylinder 16 and acts as a stopping means for cylinder 16 upon return to its non-extended position.

Oil from line 25 enters bore 16C between cylinder 16 and bearing cylinder 26 and exerts pressures on surface 16D. This pressure causes cylinder 16, screw 24, and piston 12 to retract into housing 26. Oil is forced out of lines 13 and 17 into a reservoir means (not shown). This sequence is the return stroke.

During the loading and injection periods, oil is introduced from lines 13 and 17. During the relatively low pressure metering of plastic material, oil is introduced in line 13 because only the area indicated by zig-zag line 29 need be used to ensure sufficient pressure. When the injection stroke is required, additional oil from line 17 is introduced to act on the additional area indicated by zig-zag line 28. This arrangement permits highly accurate control over the axial pressure applied.

Figure 2:
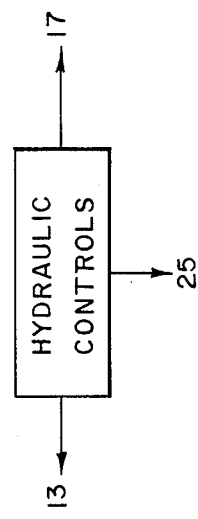
FIG. 2 is a schematic illustration of the hydraulic controls for a drive apparatus according to the invention.

FIG. 2 is a schematic illustration of the hydraulic control means used with lines 13, 17, and 25 described above.

It should be understood that the drive apparatus described and schematically depicted is merely one embodiment according to the scope of this invention. Various other combinations of features and sizes are within this invention depending on the application for which this invention is useful and following the teachings herein. For example, the drive apparatus described is useful for and in a variety of other apparatus and process applications where axial displacement and/or rotation are useful.

We claim:

1. A drive apparatus useful for screw injection molding comprising:
   means for rotating a drive shaft around a longitudinal axis;
   a drive piston having movement around and along said axis and connected by a drive shaft coupling with said drive shaft for rotation around said axis; and
   a drive cylinder concentric with and connected to said drive piston with a coupling such that; (a) said drive cylinder has no substantial rotational motion; and (b) said drive piston may rotate substantially freely relative to said drive cylinder yet may only move to any substantial extent along said axis when said drive cylinder means moves along said axis.

2. A drive apparatus according to claim 1 wherein said drive shaft coupling comprises a plurality of splines in said drive piston.

3. A drive apparatus according to claim 2 wherein said drive shaft coupling further comprises grooves in said drive piston which are functionally associated with at least one of said plurality of splines for the transmission of rotational forces to said drive piston.

4. A drive apparatus according to claim 1 further comprising means for applying hydraulic pressure to said drive piston.

5. A drive apparatus according to claim 4 wherein the drive piston hydraulic means applies pressure to said drive piston along said longitudinal axis.

6. A drive apparatus according to claim 4 further comprising means for applying hydraulic pressure to said drive cylinder.

7. A drive apparatus according to claim 6 wherein the drive cylinder hydraulic means applies hydraulic pressure to said drive cylinder along said longitudinal axis.

8. A drive apparatus according to claim 1 further comprising first hydraulic means for displacing said drive piston and said drive cylinder in a first direction and second hydraulic means for displacing said drive piston and said drive cylinder in a second direction opposite to said first direction.

9. A drive apparatus according to claim 8 wherein said first hydraulic means comprises means for independently applying hydraulic pressure to and in fluid communication with each of said drive piston and said drive cylinder.

10. A drive apparatus according to claim 8 wherein said second hydraulic means comprises means for applying hydraulic pressure to said drive cylinder.

11. A drive apparatus according to claim 1 further comprising: a collar attached to said drive shaft; and a bearing shield around said drive shaft so that axial forces on said drive shaft and toward said means for rotation are transmitted to said bearing shield.

12. A drive apparatus according to claim 1 wherein said means for rotating a drive shaft comprises a motor, a motor shaft, and a drive shaft coupling.

13. A drive apparatus according to claim 12 wherein said drive shaft coupling comprises a hydraulic coupling.

14. A drive apparatus according to claim 1 further comprising sealing gaskets for each of said drive shaft, said drive piston and said drive cylinder.

15. A drive apparatus according to claim 1 wherein said apparatus is specially adapted for use in a screw injection molding process.

16. A drive apparatus according to claim 15 further comprising an extruder ram rigidly attached to said drive piston.

17. A process for operating a screw injection molding apparatus which apparatus comprises:
means for rotating a drive shaft around a longitudinal axis;
a drive piston having movement around and along said axis and connected by a drive shaft coupling with said drive shaft for rotation around said axis; and
a drive cylinder concentric with and connected to said drive piston with a coupling such that; (a) said drive cylinder has no substantial rotational motion; and (b) said drive piston may rotate substantially freely relative to said drive cylinder yet may only move to any substantial extent along said axis when said drive cylinder means moves along said axis;
wherein said process comprises;
rotating and applying hydraulic pressure to said drive piston during metering of material for injection molding;
applying hydraulic pressure in a first direction to both of said drive piston and said drive cylinder for axial displacement of each during injection of said material for injection molding; and
applying hydraulic pressure to said drive cylinder in a second direction which is opposite to said first direction.

18. A process according to claim 17 wherein said drive piston is rotated during said injection without substantial rotation of said drive cylinder.

* * * * *